O. W. SMITH.
DETACHABLE COUPLING FOR TROLLEY POLES.
APPLICATION FILED APR. 11, 1910.
995,810.
Patented June 20, 1911.
2 SHEETS—SHEET 1.
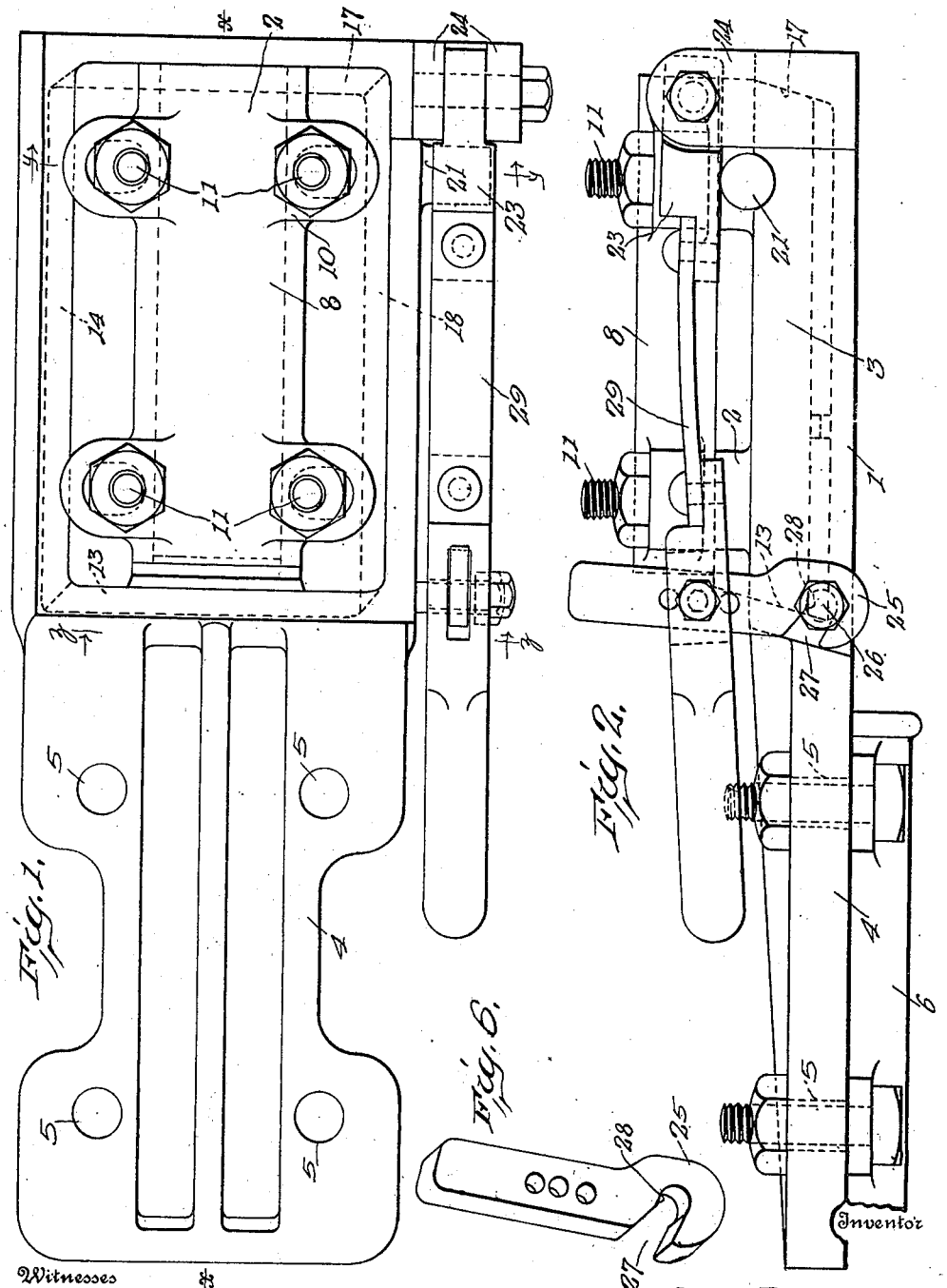
Witnesses
G. Howard Walmsley
Edward Reed
Inventor
Oscar W. Smith
By
Attorney O. W. SMITH.
DETACHABLE COUPLING FOR TROLLEY POLES.
APPLICATION FILED APR. 11, 1910.
995,810.
Patented June 20, 1911.
2 SHEETS—SHEET 2.
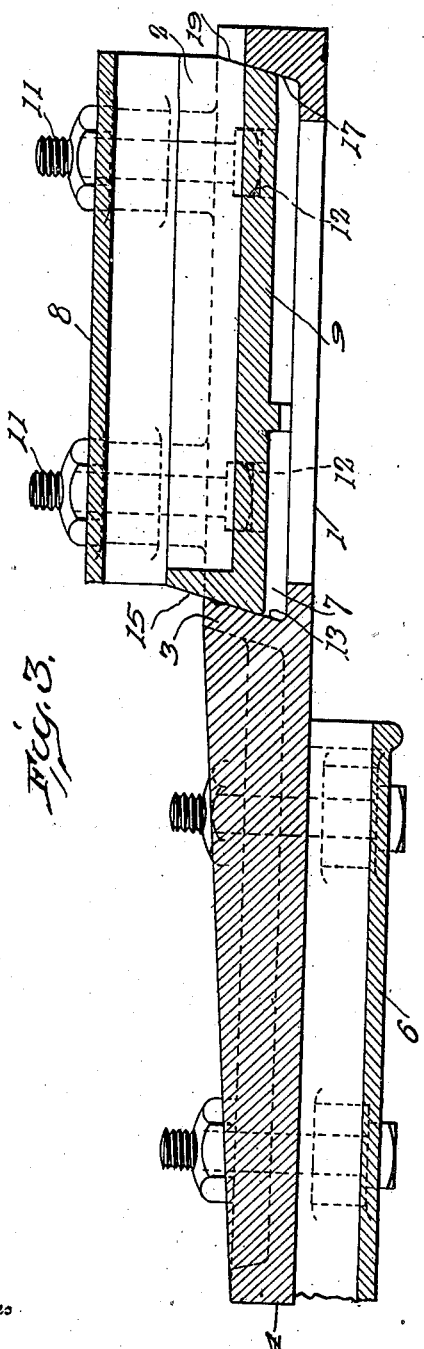
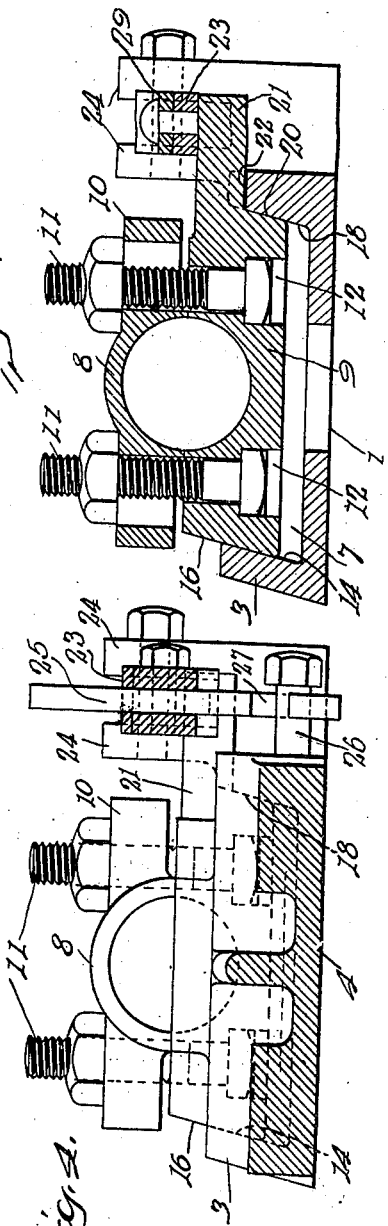
Witnesses
G. Howard Walmsley
Edward T. Reed
Inventor
Oscar W. Smith,
By H. A. Toulmin,
Attorney

UNITED STATES PATENT OFFICE.

OSCAR W. SMITH, OF SPRINGFIELD, OHIO.

DETACHABLE COUPLING FOR TROLLEY-POLES.

995,810. Specification of Letters Patent. Patented June 20, 1911.

Application filed April 11, 1910. Serial No. 554,685.

*To all whom it may concern:*

Be it known that I, OSCAR W. SMITH, a citizen of the United States, residing at Springfield, in the county of Clark and State of Ohio, have invented certain new and useful Improvements in Detachable Couplings for Trolley-Poles, of which the following is a specification, reference being had therein to the accompanying drawings.

This invention relates to detachable couplings for trolley poles, and the object of the invention is to provide a device of this character by means of which the trolley pole can be quickly and easily attached to or detached from the trolley pole base, and this without the use of implements of any kind; to provide such a coupling which will be very strong and durable and will prevent displacement or loose motion on the part of the pole.

To this end it is a further object of the invention to provide one of the members of the coupling with a recess, to provide the other member with a part adapted to fit within said recess, and to provide means for rigidly securing together the two parts of the coupling.

In the accompanying drawings, Figure 1 is a top plan view of a coupling embodying my invention; Fig. 2 is a side elevation of the same; Fig. 3 is a longitudinal, sectional view, taken on the line $x\ x$ of Fig. 1; Fig. 4 is a transverse, sectional view taken on the line $z\ z$ of Fig. 1 and looking in the direction of the arrows; Fig. 5 is a transverse, sectional view, taken on the line $y\ y$ of Fig. 1 and looking in the direction of the arrows; and Fig. 6 is a detail view of the catch for the locking arm.

In these drawings I have illustrated one embodiment of my invention and have shown the same as comprising a base member 1 and a coupling or clamping member 2. The base portion or member, as here shown, is adapted to be secured to the ordinary trolley pole base now in use without making any alterations in that base, and, to this end, it comprises a thickened body portion 3 and an extension 4 which serves to connect it to the base. This connection is preferably formed by removing the cap of the ordinary pole socket and bolting the extension 4 directly to the lower half 6 of the socket which is rigidly secured to the trolley pole base. The bolt holes 5 in the extension 4 may be bored at such points as are desirable to cause them to register with the bolt holes of the lower portion 6 of the fixed coupling. This manner of connecting the detachable coupling to the trolley pole base is a very convenient one and enables the coupling to be attached to bases now in use, but, obviously, the body portion 3 of the detachable coupling could be connected to the trolley pole base in any suitable manner.

The body portion 3 of the coupling has in its upper face a seat, such as a recess 7, which is preferably substantially rectangular in contour and is adapted to receive a correspondingly shaped portion of the clamping member 2 of the coupling. In the form of the device here shown the recess 7 is of a somewhat greater width than the pole clamp 8 forming a part of the clamping member and the clamping member has an enlarged portion or block, indicated at 9, adapted to fit within the recess 7. In the present instance the lower portion of the clamp 8 is formed in the block 9 and this block forms an integral part of the clamp, but it will be apparent that that portion of the clamping member 2 which fits within the recess 7 may be of any size and shape to adapt it to fit within the recess in the base member and may be secured to the clamp proper in any suitable manner. As stated, the lower portion of the clamp 8 is formed in the block 9 and the upper portion or cap 10 thereof may be secured to the lower portion in any suitable manner. As here shown, the cap is of ordinary construction and may, if desired, be the same cap which was removed from the pole coupling forming a part of the trolley pole base. This cap is secured to the block 9 and the lower portion of the clamp by means of bolts 11 having their heads mounted in recesses 12 in the lower side of the block 9 and extending through bolt holes in the cap 10.

The clamping member 2 may be secured to the base member 1, with the block 9 in the recess 7, in any suitable manner, and, when so secured, it will be apparent that the side walls of the recess will effectually prevent any lateral movement on the part of the clamping member or the pole carried thereby. In the preferred construction the body portion 3 of the base member 1 is provided along two of its edges with overhanging portions, these overhanging portions, in the present instance, comprising one side wall and one end wall of the recess 7, which walls are inclined upwardly and inwardly, that is, toward the recess, as shown at 13 and 14. The corresponding edges of the block 9 of the clamping member 2 are beveled, as indicated at 15 and 16, to correspond to the inclination of the walls 13 and 14. The walls of the recess 7 opposite the walls 13 and 14 are inclined upwardly and outwardly, as indicated at 17 and 18, and the adjacent portions of the edges of the block 9 are beveled to correspond to the inclination of these walls, as indicated at 19 and 20. When the block 9 is placed within the recess 7 the beveled edges 15 and 16 thereof will extend beneath the overhanging walls 13 and 14 and the beveled edges 19 and 20 will rest upon the outwardly inclined walls 17 and 18 of the recess 7. Consequently, the weight of the clamping member itself and any pressure which may be applied thereto will tend to force the beveled edges 15 and 16 into a closer engagement with the corresponding walls of the recess, thus binding the block tightly within the recess.

The block may be retained within the recess and the desired amount of pressure applied thereto in any suitable manner, but I prefer to arrange a latch along one edge of the body portion of the base member 1 which will engage a part carried by the block 9 along one of the beveled edges 19 or 20 and preferably arranged at a point near the junction of these two edges. In the present instance the block 9 has a finger or pin 21 extending laterally from the edge 20 thereof at a point near the edge 19. The pin 21 extends through a recess or cut away portion 22 in the wall 18 of the recess 7 and projects some distance beyond the side of the body portion of the base 1. A locking member is mounted on the body portion of the base member 1 and is adapted to engage the pin 21 and exert a pressure thereon, thus forcing the beveled edges of the block into firm engagement with the overhanging walls of the recess and preventing outward movement of the block. This locking member is here shown as an arm or latch 23 pivotally mounted upon pivot lugs 24 rigidly secured to and preferably cast integral with the base member 1 and extending along the side of the base member 1 to a point beyond the end of the body portion thereof opposite that end of the body portion to which the arm is pivotally connected. At this end of the arm there is provided a latch 25 which is here shown as consisting of a hook pivotally connected to the arm and adapted to engage a pin 26 extending from the adjacent side of the base member 1. This hook has a slot 27 to receive the pin 26 and the inner portion of the slot, in which the pin is located when the catch is in its locking position, has its upper wall substantially horizontal to form a shoulder, as shown at 28. A downward pressure upon the arm 23 and catch 25 will cause the horizontal portion 28 of the upper wall of the slot to engage the pin 26 and will prevent the catch from being thrown off the pin, thereby making it necessary to move the catch or hook 25 about its pivotal center before it can be released and preventing the accidental releasing of the latch. It is desirable that the arm 23 should have a certain amount of resiliency, and, to this end, I have formed the central portion of the arm of spring steel, as shown at 29, thus allowing the free end of the arm to be moved relatively to the fixed end thereof a distance sufficient to enable the hook 25 to be moved into and out of engagement with the pin 26, and, when so engaged, to exert an upward pull thereon to maintain the hook in engagement with the pin.

It will be apparent from the foregoing description that the clamping member 2 of the coupling can be attached to a trolley pole in the barn or at any other point removed from the car, and, when it is desired to attach the pole to the car, it is only necessary to insert the block 9 of the clamping member in the recess 7 of the base member of the coupling and bring the arm 23 into locking engagement with the pin 21. When locked in this position it will be apparent that the clamping member is held absolutely against movement in any direction. It will further be noted that the construction is a very strong one; that it has no parts which may be easily broken or disarranged; and that the clamping member and the pole carried thereby can be attached to and detached from the trolley pole base without the use of tools or implements of any kind.

I wish it to be understood that I do not desire to be limited to the details of construction shown and described, for obvious modifications will occur to a person skilled in the art. For example, it is immaterial how the trolley pole is secured to the clamping or socket member, the present method of securing or clamping the pole in place being shown for the purpose of illustration only.

Having thus fully described my invention, what I claim as new and desire to secure by Letters Patent, is:—

1. In a trolley pole coupling, a base member comprising a body portion having a recess therein and having an extension adapted to be secured to a trolley pole base, a socket member having a part adapted to fit within the recess in said body portion of said base member, and means for securing said part of said socket member in said recess.

2. A trolley pole coupling comprising two members, one of said members constituting a base and having means to secure the same to a trolley pole base, said base member having a wall arranged along one side thereof and having its upper portion extending inwardly, the other member of said coupling constituting a socket member and having means to secure a trolley pole thereto, said socket member having a portion adapted to extend beneath the inwardly extending portion of said wall and said base member having a part arranged to engage said socket member and cause the said portion thereof to engage said wall, one of said members having means to prevent said socket member from moving longitudinally to said wall, and a locking device to secure said socket member in engagement with said base member.

3. A trolley pole coupling comprising two members, one of said members constituting a base having means to secure the same to a trolley pole base and provided with a recess having one wall extending upward and inward and having its opposite wall extending upward and outward, the other member of said coupling constituting a socket member, having means to secure a trolley pole thereto and having a portion adapted to enter said recess, said portion having its opposite edges inclined to correspond to the inclination of the walls of said recess, and means for securing said portion of said socket member in said recess.

4. A trolley pole coupling comprising two members, one of said members constituting a base having means to secure the same to a trolley pole base and provided with a recess having one wall extending upward and inward and having its opposite wall extending upward and outward, the other member of said coupling constituting a socket member, having means to secure a trolley pole thereto and having a portion adapted to enter said recess, said portion having its opposite edges inclined to correspond to the inclination of the walls of said recess, one of said members having means to hold said members against relative movement longitudinally to said inclined walls, and means for securing said portion of said socket member in said recess.

5. A trolley pole coupling comprising a base member having a recess therein, said recess having two adjacent walls inclined upwardly and inwardly, a clamping member having a portion adapted to enter said recess, said portion having two of its edges beveled to correspond to the inclined wall of said recess, and means for locking said portion of said clamping member in said recess when the beveled edges thereof are in engagement with the inclined walls of said recess.

6. A trolley pole coupling comprising a base member having a recess therein, said recess having two adjacent walls inclined upwardly and inwardly and having the other two walls inclined upwardly and outwardly, a clamping member having a portion adapted to enter said recess, said portion having its walls beveled to correspond to the inclination of the adjacent walls of said recess, and means for securing said portion of said clamping member in said recess.

7. A trolley pole coupling comprising a base member having a recess therein, said recess having two adjacent walls inclined upwardly and inwardly and having the other two walls inclined upwardly and outwardly, a clamping member having a portion adapted to enter said recess, said portion having its walls beveled to correspond to the inclination of the adjacent walls of said recess, an arm pivotally mounted on said base member and adapted to engage a part of said clamping member, and means for securing said arm in its locking position.

8. A trolley pole coupling comprising a base member having a recess therein, said recess having two adjacent walls inclined upwardly and inwardly and having the other two walls inclined upwardly and outwardly, a clamping member having a portion adapted to enter said recess, said portion having its walls beveled to correspond to the inclination of the adjacent walls of said recess, a resilient arm pivotally mounted on said base member and adapted to engage a part of said clamping member, and means for securing said arm in its locking position.

9. A detachable coupling for trolley poles comprising a base member having a recess therein, said recess having two of its walls inclined upwardly and inwardly and its other two walls inclined upwardly and outwardly, a clamping member comprising a block adapted to enter said recess and having its edges beveled to correspond to the inclination of the corresponding walls of said recess, a pin rigidly secured to said clamping member, and extending across one of the walls of said recess, an arm pivotally mounted on said base member and adapted to engage said pin, and means for locking said arm in engagement with said pin.

10. A detachable coupling for trolley poles comprising a base member having a recess therein, said recess having two of its walls inclined upwardly and inwardly and its other two walls inclined upwardly and outwardly, a clamping member comprising a block adapted to enter said recess and having its edges beveled to correspond to the inclination of the corresponding walls of said recess, a pin rigidly secured to said clamping member and extending across one of the walls of said recess, a resilient arm pivotally mounted on said base and adapted to engage said pin, a hook pivotally mounted on said arm, and a pin carried by said base member and adapted to be engaged by said hook.

11. In a trolley pole coupling, the combination, with two members, one of said members constituting a base and having means to secure the same to a trolley pole base and being provided with a recess, the other of said members constituting a socket member having means to secure a trolley pole thereto and being provided with a portion adapted to enter the recess in the first-mentioned member, a laterally extending projection carried by said socket member, a resilient arm pivotally mounted on said base member and arranged to extend above and engage said projection, a projection carried by said base member, and a hook pivotally mounted on said resilient arm and having a slot to receive the projection carried by said base member, said slot having a portion of its upper wall horizontal to engage said pin when said arm is moved downward about its pivotal center.

12. In a trolley pole coupling, the combination, with a base member comprising a body portion and an extension, said extension being adapted to be secured to a trolley pole base and said body portion having a recess, two adjacent walls of said recess being inclined upwardly and inwardly, and the two opposite walls of said recess being inclined upwardly and outwardly, a clamping member having a block adapted to enter said recess and having its edges beveled to correspond to the inclination of the walls of said recess, a pin rigidly secured to said clamping member and extending across one of the walls of said recess, a resilient arm pivotally mounted on said base member, arranged to extend above and engage said pin, a second pin secured to said base member, and a hook pivotally mounted on said arm and having a slot to receive said second pin, said slot having a portion of its upper wall horizontal to engage said pin when said arm is moved downward about its pivotal center.

13. A device of the character described comprising a base member adapted to be secured to a trolley pole and having a recess therein, one wall of said recess having its upper portion extending inwardly, a socket member having means for securing a trolley pole thereto and provided with a portion adapted to enter said recess, said portion having one edge arranged to engage said inwardly extending wall and having its other edges arranged to engage the corresponding walls of said recess, a laterally extending projection carried by one of said members, and a resilient locking device carried by the other of said members to engage said projection and retain said members in engagement one with the other.

14. A device of the character described comprising a base member adapted to be secured to a trolley pole base and having a recess therein, a socket member adapted to receive and hold the trolley pole and having a part adapted to enter said recess, coöperating locking devices carried by said member to retain said part of said socket member in said recess and comprising a lateral projection carried by one of said members, and a resilient arm carried by the other of said members and having a part adapted to engage said projection.

In testimony whereof, I affix my signature in presence of two witnesses.

OSCAR W. SMITH.

Witnesses:
E. O. HAGAN,
HARRIET L. HAMMAKER.

---

Copies of this patent may be obtained for five cents each, by addressing the "Commissioner of Patents, Washington, D. C."